US012663147B2

(12) United States Patent
Bhat et al.

(10) Patent No.: US 12,663,147 B2
(45) Date of Patent: Jun. 23, 2026

(54) COOLING SYSTEMS AND APPARATUS FOR ELECTRONIC DEVICES AND RELATED METHODS

(71) Applicant: Intel Corporation, Santa Clara, CA (US)

(72) Inventors: Praveen Kashyap Ananta Bhat, Bangalore (IN); Bijendra Singh, Bangalore (IN); Navneet Kumar Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/848,140

(22) Filed: Jun. 23, 2022

(65) Prior Publication Data

US 2022/0316692 A1 Oct. 6, 2022

(51) Int. Cl.
| | |
|---|---|
| *F21V 29/00* | (2015.01) |
| *F21V 29/60* | (2015.01) |
| *G06F 1/16* | (2006.01) |
| *G06F 1/20* | (2006.01) |
| *G06F 3/02* | (2006.01) |

(52) U.S. Cl.
CPC ............ *F21V 29/60* (2015.01); *G06F 1/1662* (2013.01); *G06F 1/203* (2013.01); *G06F 3/0202* (2013.01)

(58) Field of Classification Search
CPC ......... F21V 29/60; G06F 1/1662; G06F 1/203
See application file for complete search history.

(56) References Cited

U.S. PATENT DOCUMENTS

| | | | |
|---|---|---|---|
| 10,871,809 B1 * | 12/2020 | Horiuchi | ................ H01H 13/83 |
| 11,455,016 B2 | 9/2022 | Ku et al. | |
| 2012/0186961 A1 * | 7/2012 | Oike | ....................... G06F 1/203 |
| | | | 200/5 A |
| 2021/0012984 A1 * | 1/2021 | Chen | ..................... H01H 13/83 |
| 2021/0034165 A1 * | 2/2021 | Shipman | ................ H01H 13/83 |
| 2021/0092517 A1 | 3/2021 | Kulkarni et al. | |
| 2022/0129052 A1 | 4/2022 | Schwager et al. | |

OTHER PUBLICATIONS

European Patent Office, "Partial European Search Report," issued in connection with European Patent Application No. 23170667.2, dated Nov. 20, 2023, 12 pages.
Gore Materials Technology, "Venting With Hydrophobic vs. Oleophobic Membranes," W.L. Gore & Associates, Inc., 2011, 2 pages.
European Patent Office, "Extended European Search Report," issued in connection with European Patent Application No. 23170667.2, dated Feb. 12, 2024, 11 pages.
European Patent Office," Communication under Rule 71(3) EPC," mailed in connection with European Patent Application No. 23170667. 2, on Feb. 13, 2026, 8 pages.

* cited by examiner

*Primary Examiner* — Gerald J Sufleta, II
(74) *Attorney, Agent, or Firm* — Hanley, Flight & Zimmerman, LLC

(57) ABSTRACT

Cooling systems and apparatus for electronic devices and related methods are disclosed. An example electronic device includes a housing including a cover; a keyboard carried by the housing, the keyboard including keycaps, at least a portion of the keycaps protruding relative to the cover, a first gap between a first one of the keycaps and the cover; a backlight carried by the housing, the backlight including a first opening; and a fan carried by the housing, the first opening defining an airflow path in the housing between the fan and the first gap.

20 Claims, 5 Drawing Sheets

604

ASSEMBLE BACKLIGHT

700
COAT WALLS OF OPENINGS DEFINED BACKLIGHT MEMBRANES WITH REFLECTIVE COATING

702
ARRANGE MEMBRANES OF BACKLIGHT TO ALIGN OPENINGS IN MEMBRANES

704
POSITION ONE OR MORE LIGHT SOURCES AT AN ANGLE RELATIVE TO SURFACE OF LIGHTGUIDE PLATE TO ADJUST PATH OF LIGHT RELATIVE TO OPENING(S)

606

COOLING SYSTEMS AND APPARATUS FOR ELECTRONIC DEVICES AND RELATED METHODS

FIELD OF THE DISCLOSURE

This disclosure relates generally to electronic devices and, more particularly, to cooling systems and apparatus for electronic devices and related methods.

BACKGROUND

An electronic device (e.g., consumer electronic devices) such as a laptop may include airflow vents to provide for cooling of electronic components of the device. In some instances, the vents are defined in exterior surfaces of a housing of the device. The electronic components may include processor circuity, power supplies, storage, or other structures.

Figures 1, 2:
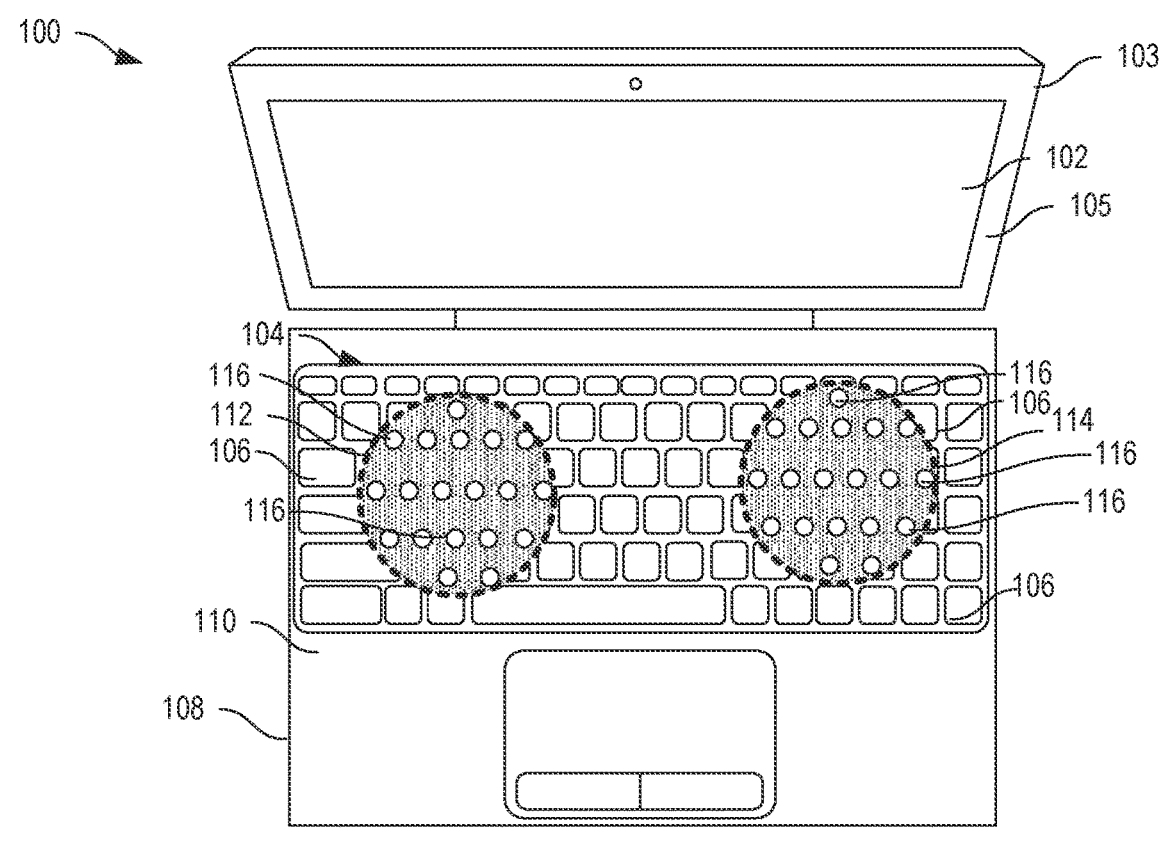
FIG. 1 illustrates an example electronic device constructed in accordance with teachings of this disclosure.
FIG. 2 illustrates a portion of a keyboard of the example electronic device of FIG. 1.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

An electronic device such as a laptop may include airflow vents to provide for cooling of electronic components of the device. Such components may include, for example, processor circuitry, a power supply, memory, etc. In some instances, the vents are formed in an exterior surface or cover of the device. For example, a housing defining a base of a laptop includes a first cover (also known as a C-cover) from which the keyboard is accessed and second cover (also known as a D-cover) opposite the first cover, where the second cover defines a bottom panel of laptop that rests on a surface such as a table. Airflow inlets or vents can be formed in the second cover (e.g., the D-cover) of the laptop to facilitate cooling of the device. However, the presence of vents in the housing can affect an aesthetic design of the electronic device due to the visibility of the vents to the user. For example, an uninterrupted surface of a D-cover that does not include vents or airflow inlets may be preferred for aesthetic purposes. Further, the presence of vents may allow dust or debris to enter the housing.

Some known electronic devices include fans to draw air into the device via gaps formed between the keys of the keyboard and the cover of the device housing surrounding the keys (e.g., a C-cover). However, some such known devices do not include a backlight for the keyboard because the solid membrane layers of the backlight can obstruct the flow of air within the device and, thus, hinder cooling efforts.

Disclosed herein are example electronic devices that provide for airflow through a keyboard of the device including a backlight. Examples disclosed herein include one or more fans to facilitate cooling of the components of the electronic device via air drawn into the device through gaps in the keyboard. Examples disclosed herein enable a backlight to be used with the keyboard without introducing shadows or otherwise disrupting the brightness of the backlight to accommodate the airflow inlets. In some examples, the backlight maintains a uniform or substantially uniform (e.g., +/−15% difference from maximum to minimum brightness) across the keys.

Examples disclosed herein including openings formed in one or more membrane layers of the backlight to facilitate airflow during operation of the fans. In some examples disclosed herein, respective surfaces or walls of the backlight membrane layer(s) defining the openings are coated with a reflective material to facilitate reflection of light emitted by the backlight. In some examples disclosed herein, the backlight includes a plurality of lights such as light emitting diodes (LEDs). In some such examples, an orientation and/or brightness of the light(s) (e.g., LEDs) provide for uniform or substantially uniform brightness across the keyboard. Thus, examples disclosed herein provide for cooling via fans located below a keyboard while enabling a backlight to uniformly illuminate the keyboard from beneath the keyboard. As used herein, "uniformly illuminate" means no more than a +/−15% different between brightest and dimmest spots. Disclosed cooling systems permit components with higher thermal design power to be used while providing for cooling (e.g., efficient cooling) via the keyboard inlets. In some examples, such keyboard inlets provide lower resistance airflow paths as compared to inlets in a D-cover of the device.

FIG. 1 illustrates an example electronic device 100 constructed in accordance with teachings of this disclosure. The example electronic device 100 of FIG. 1 is a laptop. However, other type(s) of electronic devices such as a desktop computer, an all-in-one PC, a hybrid or convertible PC, a phone, etc. may employ the teachings of this disclosure. The example electronic device 100 includes a display screen 102 supported by a first housing 103 of the device 100. The first housing 103 includes back panel (also known as an A-cover, not shown) that is visible when the device 100 (e.g., a laptop) is closed and bezel 105 (also known as a B-cover) that surrounds the display screen 102. The display screen 102 and/or the first housing 103 can have different sizes and/or shapes than shown in FIG. 1.

The example electronic device 100 of FIG. 1 includes a keyboard 104 to enable a user to provide input(s). Such inputs may be to type a message (e.g., an email), draft a document (e.g., via a word processing program), play a game, and/or to interact with the device 100 or a program and/or application executed by the deice 100 (e.g., in response to content displayed via the display screen 102 of the device 100, to wake the device 100 from a sleep mode, etc.). The keyboard 104 includes a plurality of keycaps 106. The keycaps 106 cover switches of the keyboard 104. In the example of FIG. 1, the keyboard 104 can be a dome-switch keyboard or a scissor-switch keyboard in which the switches are defined by domes made of metal or rubber. When a particular keycap 106 of the keyboard 104 is pressed, the keycap 106 moves a corresponding switch (e.g., depresses or collapses the switch). The movement of the switch causes two contact layers or membranes (FIG. 3) of the keyboard 104 to touch (e.g., closes the switch). The membranes can include contact pads and electrical traces. When the two membranes touch, a circuit is completed and current flows between the contacts (e.g., via electrical traces of the membranes). The current is an electrical signal that is interpreted by processor circuitry of the electronic device 100 to identify the selected key.

In some examples, the keyboard 104 includes a plate 304 (FIG. 3) to support the membranes. The plate may include metal, plastic, and/or other materials. The keyboard 104 and/or the respective keycaps 106 can have a different size, shape, arrangement, and/or orientation than the example shown in FIG. 1. For example, the keyboard 104 can be a curved keyboard, a split keyboard, etc.

In the example of FIG. 1, the keyboard 104 includes a backlight 306 (FIG. 3) to illuminate at least a portion of the keycaps 106. For example, the backlight can illuminate character labels on each keycap and/or areas surrounding the keycaps 106.

In the example of FIG. 1, the keyboard 104 is supported by a second housing 108 of the device 100 (e.g., a base of the laptop). As disclosed herein, the keycaps 106 at least partially protrude relative to a first surface or cover 110 (e.g., a C-cover) of the second housing 108. The first cover 110 is a web or grid of openings 200 (FIG. 2) through which the keycaps 106 of the keyboard 104 protrude when the first cover 110 is disposed over the membrane(s) of the keyboard 104. In the example of FIG. 1, the second housing 108 of FIG. 1 is coupled (e.g., hingedly coupled) to the first housing 103 such that the first housing 103 and the second housing 108 form a clamshell protecting the keyboard 104 and the display screen 103 when the device 100 (e.g., the laptop) is closed. In other examples, the keyboard 104 is a peripheral input device separate from the electronic device 100. The second housing 108 can have a different size and/or shape than the example shown in FIG. 1.

The second housing 108 of the electronic device 100 supports electronic components of the device 100 such as processor circuitry, a battery, etc. During operation of the device 100, the electronic component(s) of the device 100 generate heat. The example electronic device 100 includes one or more fans (FIG. 3) to cool the electronic component(s) carried by the second housing 108 by causing air from the ambient environment to be drawn into the second housing 108 through the keyboard 104. In the example of FIG. 1, a first fan is disposed below the keycaps 106 of the keyboard 104 as represented by a first dashed circle 112 of FIG. 1. Also, a second fan is disposed below different ones of the keycaps 106 of the keyboard 104 as represented a second dashed circle 114 of FIG. 1. The example electronic device 100 can include fewer or additional fans and/or fans located at different locations relative to the keycaps 106 of the keyboard 104 than shown in FIG. 1.

As disclosed herein, the fans draw air from the ambient environment into the second housing 108 via gaps between the keycaps 106 of the keyboard and the first cover 110 of the second housing 108. As also disclosed herein, openings are defined in the membrane layers of the keyboard 104 and the backlight to define flow paths in the second housing 108 between (a) the gaps between the keycaps 106 of the keyboard and the first cover 110 of the second housing 108 and (b) the fans disposed in the second housing 108. The openings defined in the layers of the keyboard (e.g., the keyboard membranes, the backlight layers) are represented by the circles 116 of FIG. 1. As illustrated in FIG. 1, the openings can be defined proximate to or within a region corresponding to the dashed circles 112, 114 that represent the locations of the fans. The example electronic device 100 can include additional or fewer airflow paths and/or airflow paths located at different locations relative to the keycaps 106 of the keyboard 104 than shown in FIG. 1.

FIG. 2 illustrates a portion of the keyboard 104 of the example electronic device 100 of FIG. 1 including some of the keycaps 106. As illustrated in FIG. 2, the keycaps 106 at least partially protrude relative to the first cover 110 (e.g., a C-cover) of the second housing 108 of the example electronic device 100 through openings 200 defined by the first cover 110. An airgap or spacing 202 is defined between the web or the first cover 110 and each of the keycaps 106. Put another way, a space 202 is defined between the edges of each keycap 106 and a portion of the first cover 110 surrounding the corresponding keycap 106. The spaces 202 can be annular, for example, where the space 202 surrounds the keycap 106 on all sides (e.g., edges and corners of the keycap 106). As disclosed herein, air can flow through the airgap or space 202 during operation of the fans to facilitate cooling of the components of the device 100 in the second housing 108. The airgaps 202 can have a size of, for example, 0.1 to 0.2 millimeters (mm) on each side of the keycap 106. In this example, the keycap 106 can have a width and length of approximately 18 mm. In this example, the area of the airgap or space 202 is about 18.4 mm×18.4 mm, considering a 0.2 mm gap on each side between the keycap and the cover 110. Although in the example of FIG. 2, the airgaps 202 are present for each keycap 106, in some examples, the airgaps 202 are not present for each keycap 106, but instead are present for a subset (e.g., less than all) of the keycaps 106.

In the example of FIG. 2, the first cover 110 includes the openings 200, where each of the openings 200 receives one keycap 106. In this example, the web defined by the first cover 110 surrounds each of the keycaps 106. In such examples, the airgaps 202 define a ring about each keycap 106. In other examples, the first cover 110 includes an opening 200 that receives two or more keycaps 106. For example, the keyboard 104 can include a number pad in which keycaps 106 representing numbers are grouped together and protrude through one opening in the first cover 106. In such examples, the web defined by the first cover 110 surrounds two or more keycaps 106. In some such examples, an airgap 202 is defined between edges of the keycaps 106 and the portion or web of the first cover 110 surrounding the group of keycaps 106. In some such examples, additional airgaps 202 can be defined between the keycaps 106 (e.g., based on the spacing between the keycaps 106 disposed within the opening defined by the first cover 110).

Figure 3:
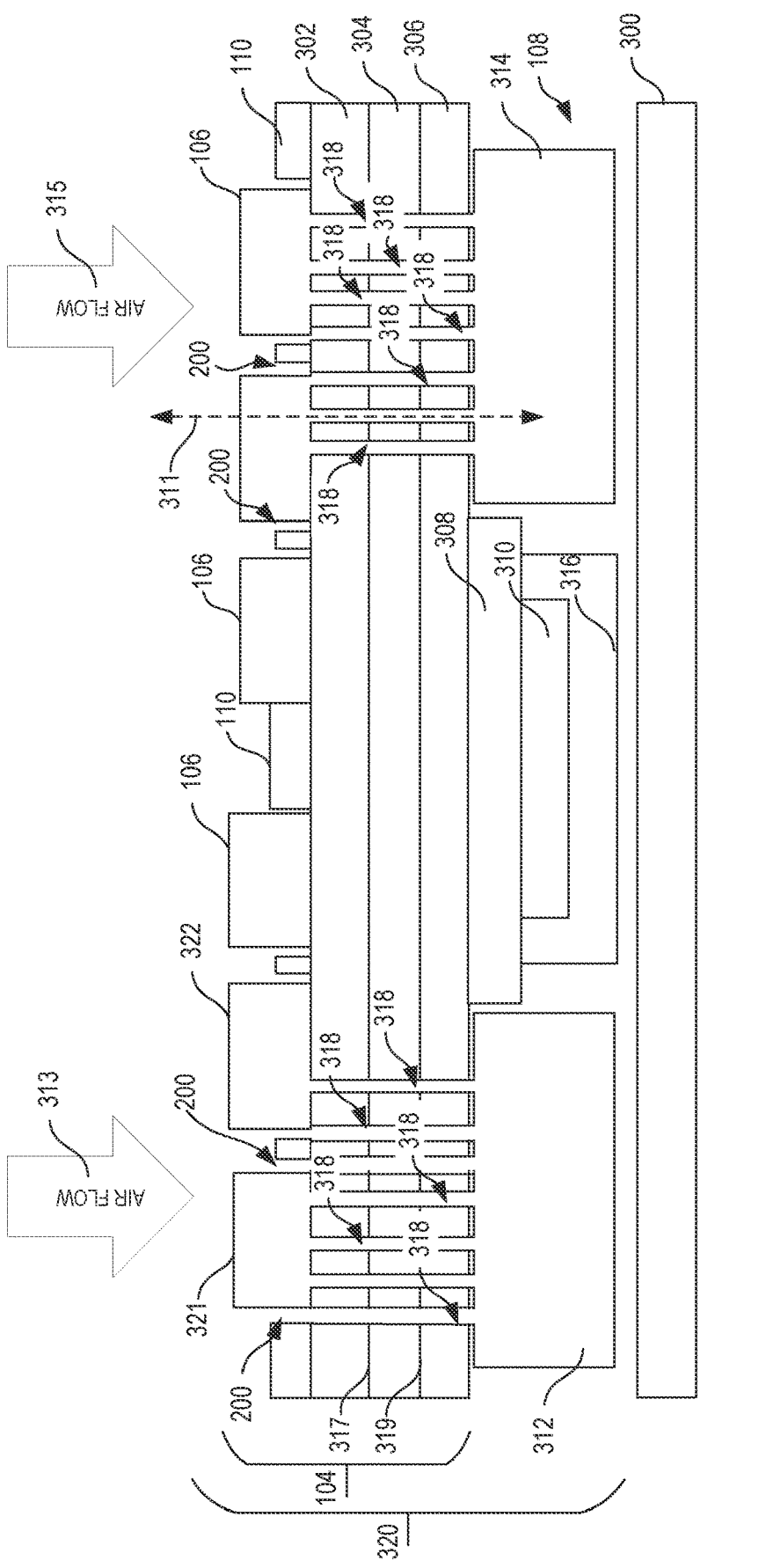
FIG. 3 illustrates an example cooling system of the electronic device of FIGS. 1 and 2 in accordance with teachings of this disclosure.

FIG. 3 is a graphical representation of the example second housing 108 of FIG. 1 including the keyboard 104 and electronic component(s) of the device 100 to be cooled via airflow through the keyboard 104. As shown in FIG. 3, the second housing 108 includes the first cover 110 (e.g., a C-cover) and a second surface or cover 300 (e.g., a D-cover) opposite the first cover 110.

As shown in FIG. 3, the example keyboard 104 includes membranes 302 that carry electrical traces or contacts to engage respective ones of the keycaps 106 when the corresponding keycap(s) 106 is/are depressed. The example keyboard 104 includes a plate 304 to support the membranes 302. In the example of FIG. 3, the plate 304 is a metal plate, however, the plate 304 can additionally or alternatively include other materials (e.g., plastic). The keyboard 104 includes a blacklight assembly 306 (also sometimes referred to herein as the backlight 306) to output light to illuminate at least a portion of the keyboard 104 visible via the first cover 110 (e.g., character labels on the keycaps 106). The membranes 302 and the plate 304 can include transparent or substantially transparent portions (e.g., windows, cutouts) to permit the light from the backlight assembly 306 to pass through the layers of the keyboard 104. The membranes 302, the plate 304, and the backlight assembly 306 are disposed in the second housing 108. As discussed in connection with FIGS. 1 and 2, the keycaps 106 of the keyboard 104 at least partially protrude relative to the first cover 110 of the second housing 108. Also, the airgaps 202 are defined between the respective keycaps 106 and the corresponding portions of the first cover 110 surrounding the keycaps 106.

In the example of FIG. 3, in addition to the keyboard 104, the second housing 108 supports additional electronic components of the device 100. For example, a motherboard or primary circuit board 308 of the device 100 is disposed in the second housing 108. The motherboard 308 can include, for instance, a processor socket to receive a central processing unit (CPU) of the device 100. Also, in the example of FIG. 3, the second housing 108 supports a system-on-chip (SOC) 310. The second housing 108 can include other electronic components of the device 100 such as a battery.

During operation of the device 100, the electronic components of the motherboard 308 and/or the SOC 310 generate heat. The second housing 108 of the example electronic device 100 of FIG. 3 carries a first fan 312 and a second fan 314 to draw air into the second housing 108 via the airgaps 202 defined in the keyboard 104 to cool the electronic components, as represented by the arrows 313, 315 of FIG. 3. As disclosed herein, airflow paths extend from the airgaps 202 of the keyboard 104 to the fans 312, 314 to enable the fans 312, 314 draw air from the ambient environment into the second housing 108. The fans 312, 314 include blades (not shown) that rotate about an axis extending through each of the fans 312, 314 to draw air from the ambient environment. The second housing 108 can include additional or fewer fans than shown in FIG. 3. Also, the fans 312, 314 can be located in different locations in the second housing 108 than shown in FIG. 3.

In the example of FIG. 3, the air in the ambient environment that is drawn into the housing 108 via the fans 312, 314 passes over the electronic components of the motherboard 308 and/or the SOC 310 to facilitate cooling of the components. The heated air is drawn away from the electronic components via means for thermal dissipation. In the example of FIG. 3, the thermal dissipation means includes a heat sink 316. The heat sink 316 can include, for instance, aluminum or cooper. The heat sink 316 can be located in a different location in the second housing 108 than shown in FIG. 3. In some examples, the means for thermal dissipation includes, for example, a vapor chamber to spread the heat. In some examples, the heated air is removed from the second housing 108 via vents located, for instance, near (e.g., behind, under, adjacent, etc.) the heat sink 316.

In the example of FIG. 3, the airflow paths extending between the airgaps 202 of the keyboard 104 and the fans 312, 314 are defined by cutouts, openings, or apertures 318 in the membranes 302, the plate 304, and the backlight assembly 306 of the second housing 108, respectively. The openings 318 (e.g., corresponding to the circles 116 of FIG. 1) can be formed in the respective layers of the membranes 302, the plate 304, and the backlight assembly 306 during manufacturing. For examples, the openings 318 can be drilled, pierced, or otherwise cut into the respective membranes 302, the plate 304, and membranes (FIG. 4) defining the backlight assembly 306 prior to assembly of the keyboard 104. In the example of FIG. 3, fourteen airflow passages are defined by alignment of the corresponding openings 318 formed in the membranes 302, the plate 304, and the respective layers of the backlight assembly 306. Additional or fewer openings 318 can be formed in each layer than shown in FIG. 3. Thus, the number of airflow passages can differ from the example shown in FIG. 3.

The openings 318 extend through the respective surfaces of the membranes 302, the plate 304, and membranes of the backlight assembly 306. For example, as shown in FIG. 3, the openings 318 formed in the plate 304 extend from a first surface 317 of the plate 304 to a second surface 319 of the plate 304 opposite the first surface 317. The openings 318 are aligned when the membranes 302, the plate 304, and the backlight assembly 306 are assembled or disposed in the second housing 108. Put another way, an axis 311 extending perpendicularly between (a) the first cover 110 or a keycap 106 and (b) the second cover 300 passes through the openings 318 defined in the membranes 302, the plate 304, and the layers of the backlight assembly 306 when the openings 318 are aligned and the keyboard 104 is in the second housing 108. Thus, the aligned openings 318 define the airflow paths (also referred to herein as airflow passages) between the airgaps 202 and the fans 312, 314. The airgaps 202, the openings 318, the fans 312, 314, and the heat sink 316 define a cooling system 320 of the electronic device 100. Although the airflow paths defined by the openings 318 and extending between the airgaps 202 and the fans 312, 314 are shown in FIG. 3 as vertical stripes or passages, in other examples, the airflow paths are circuitous.

In the example of FIG. 3, the openings 318 are defined in areas of the respective membranes 302, the plate 304, and the backlight assembly 306 that are proximate to the respective fans 312, 314. As a result, the amount of air drawn or pulled into the second housing 108 by rotation of the fans 312, 314 is sufficient for cooling the device 100. However, the openings 318 can be formed at different locations than shown in FIG. 3. The openings 318 can have a different size or shape than the example openings 318 shown in FIG. 3. In the illustrated example, the respective openings 318 have a diameter of two millimeters. However, the diameter of one or more (e.g., some or all) of the openings 318 could be larger or smaller (e.g., 0.8 mm) in other examples.

As shown in FIG. 3, when the membranes 302, the plate 304, and the backlight assembly 306 are assembled in the second housing 108, the airflow paths defined by the openings 318 are located proximate to the keycaps 106 such that air flows through the airgaps 202 defined by the keycaps 106 and into the openings 318. For instance, as shown in FIG. 3, multiple openings 318 are in fluid communication with the airgaps 202 defined by a first keycap 321 (e.g., one of the keycaps 106 at the far left in FIG. 3). Also, additional openings 318 are defined proximate to a second keycap 322 (e.g., another one of the keycaps 106) adjacent the first keycap 321. Air flowing through the airgaps 202 defined by the first keycap 321 and the second keycap 322 travels into the second housing 108 via the openings 318 proximate to the keycaps 321, 322.

In some examples, the keycaps 106, 321, 322 extend over or partially over one or more openings 318 while permitting airflow to enter the openings 318. Put another way, air can flow through the airgaps 202 and under the keycaps 106, 321, 322 into the openings 318. For example, as shown in FIG. 3, the first keycap 321 extends over three openings 318. Also, two openings 318 are defined adjacent to the first keycap 321. Air flows through the airgaps 202 associated with the first keycap 321 into the openings 318. In some examples, a keycap 106 can be associated with two openings 318, four openings 318, etc. The openings 318 can be located at different positions relative to the keycaps 106, 321, 322 than shown in FIG. 3.

In the example of FIG. 3, air flows into the second housing 108 via the airgaps 202 defined by one or more keycaps 106 and the airflow paths defined by the openings 318 and in fluid communication with the airgap(s) 202. Referring again to FIG. 1, the openings 116, 318 can be located or clustered within a region of the keyboard 104 based on the locations of the fans 312, 314 relative to the keyboard 104. Put another way, multiple sets or clusters of openings 116, 318 can be defined relative to the keyboard 104. In other examples, the openings 116, 318 exist around all of the keycaps 106.

In some examples, a user may accidentally spill liquid on the keyboard 104 and the liquid could enter the openings 318 via the airgaps 202. In some examples, the plate 304 includes a hydrophobic material or coating over at least a portion of a surface of the plate 304 facing toward the keycaps 106. For example, the hydrophobic material could be applied to a portion of the plate 304 that includes the openings 318 formed therein. The hydrophobic material can prevent or reduce (e.g., minimize) damage to the keyboard 104 and/or the electronic components of the device 100 due to, for instance, accidental liquid spillage over the keyboard 104.

Figure 4:
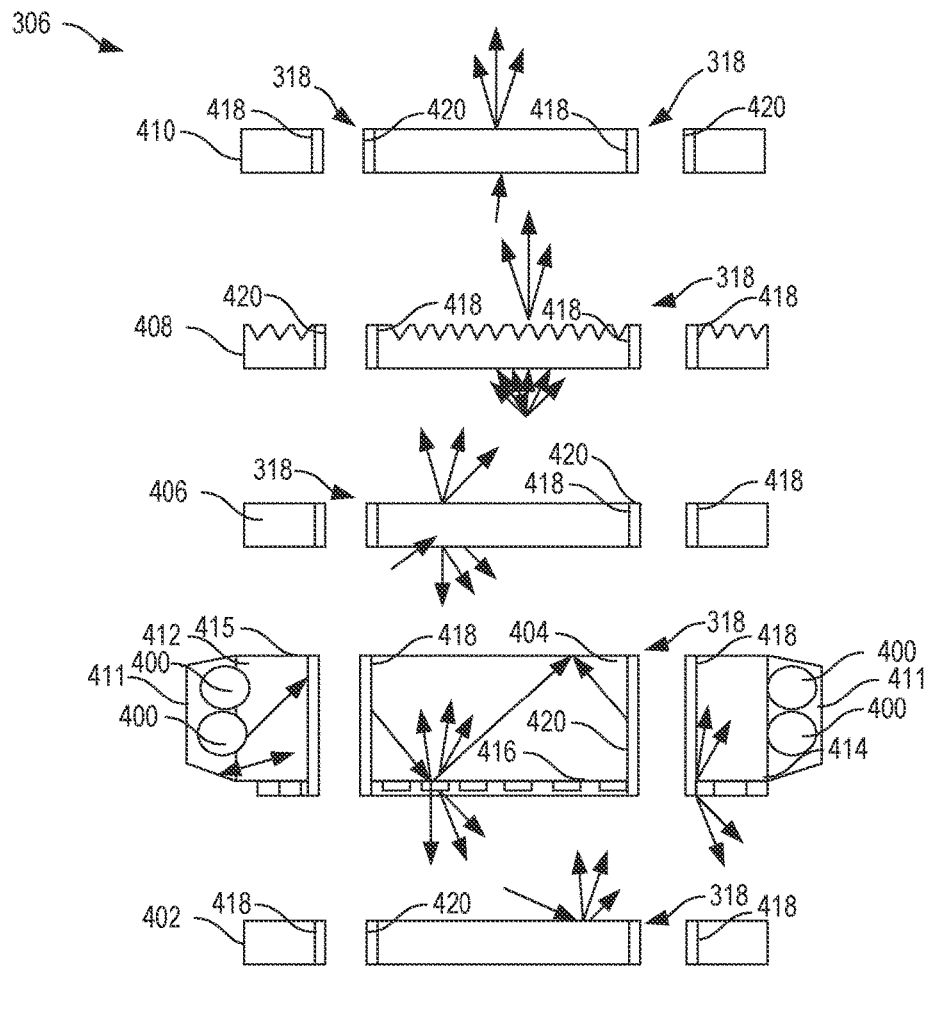
FIG. 4 is an exploded view of an example backlight assembly of the electronic device of FIGS. 1-3 in accordance with teachings of this disclosure.

FIG. 4 is an exploded view of the backlight assembly 306 of the electronic device 100 of FIGS. 1-3. The example backlight assembly 306 of FIG. 4 includes light sources 400, a reflector 402, a lightguide plate 404, diffuser film 406, prism film 408, and a coversheet 410. In some examples, the backlight assembly 306 includes additional or fewer components than shown in the example of FIG. 4. For instance, the backlight assembly 306 may not include the coversheet 410. The reflector 402, the lightguide plate 404, the diffuser film 406, the prism film 408, and the coversheet 410 are sometimes referred to herein in combination as the layers or membranes of the backlight assembly 306.

The light sources 400 of the example backlight assembly 306 of FIG. 3 can include light emitting diodes (LEDs). The light sources 400 can include other types of light sources, such as cold cathode fluorescent lamps (CCFL). As shown in FIG. 4, the light sources 400 are supported by printed circuit boards 411 located on a first side 412 of the lightguide plate 404 and a second side 414 of the lightguide plate 404 opposite the first side 412. The lightguide plate 404 diffuses light emitted by the light sources 400 at angles and/or patterns such that the light passes through a first surface 415 of the lightguide plate 404. The light passing through the first surface 415 travels through the diffuser film 406, the prism film 408, and the coversheet 410 to illuminate portion(s) of the keyboard 104 (e.g., portions of the keycaps 106) disposed above the backlight assembly 306. The diffuser film 406, the prism film 408, and the coversheet 410 can help direct and/or distribute the light such that some or all of the keyboard 104 (e.g., the keycaps 106) appears to be illuminated at a consistent or substantially consistent brightness.

In the example of FIG. 4, some of the light emitted by the light sources 400 may pass through a second surface 416 of the lightguide plate 404, where the second surface 416 is opposite the first surface 415. The reflector 402 reflects or redirects the light passing through the second surface 416 of the lightguide plate 404. The returned light passes through the first surface 415 of the lightguide plate 404 to illuminate the keyboard 104 (e.g., the keycaps 106).

As disclosed in connection with FIG. 3, the backlight assembly 306 includes the openings 318 formed in the layers of the backlight assembly 306 including the reflector 402, the lightguide plate 404, the diffuser film 406, the prism film 408, and the coversheet 410. Thus, the backlight assembly 306 is not a barrier to the airflow entering via the airgaps 202 of the keyboard 104 during operation of the fans 312, 314 (FIG. 3). Rather, the backlight assembly 306 facilitates the flow of air between the airgaps 202 of the keycaps 106 and the fans 312, 314. The openings 318 can be formed by, for instance, drilling, piercing, or otherwise cutting the openings 318 into the respective components of the backlight assembly 306 prior to assembly of the backlight 306. The size, shape, and/or locations of the openings 318 can differ from the examples shown in FIGS. 3 and/or 4.

In some examples, introducing the openings 318 into the layers of the backlight assembly 306 can disrupt the path(s) of light emitted by one or more of the light sources 400, which can result in the creation of shadows, or areas of reduced brightness on the backlit keyboard 104 for the keycaps 106 positioned near the openings 318. As illustrated in FIG. 4, the openings 318 are defined by respective walls of the reflector 402, the lightguide plate 404, the diffuser film 406, the prism film 408, and the coversheet 410. The walls 418 are created when the openings or cutouts 318 are formed in the reflector 402, the lightguide plate 404, the diffuser film 406, the prism film 408, and the coversheet 410. In some instance, the walls 418 block at least a portion of one or more paths of light from the light sources 400 through the layers of the backlight assembly 306. The blockage of the path(s) of light by the walls 418 can affect the uniformity of the brightness of the backlight across the keyboard 104. Examples disclosed herein contemplate adjustments to the properties of the openings 318 and/or the light sources 400 to prevent or substantially mitigate the effects of shadowing for the keyboard backlight 306.

To this end, in some examples, the walls 418 of the reflector 402, the lightguide plate 404, the diffuser film 406, the prism film 408, and the coversheet 410 defining the openings 318 are coated with reflective material 420. The reflective material 420 (e.g., a glossy coating such as white paint, reflective materials that can be coupled (e.g., mounted or adhered to) the wall(s) 418) increases reflection of the light emitted by the light sources 400 and passing through the portions of the layers of the backlight assembly 306 including the openings 318. Due to the reflective material, rather than absorbing the light, the walls 418 defining the openings 318 reflect the light. Thus, although the openings 318 interrupt the layers of the backlight assembly 306, the reflective material 420 provides for internal reflection of the light. As a result, the reflective material 420 reduces (e.g., eliminates, substantially eliminates, or otherwise mitigates) the effects of the openings 318 to thoroughly reduce the creation of shadows regions. The reflective material 420 can also prevent leakage of light from the openings 318, or bright spots corresponding to the locations of the openings 318 that can disrupt the uniformity of brightness across keyboard 104.

In some examples, one or more properties of the light sources 400 is/are adjusted to reduce or prevent the appearance of shadows. For example, the brightness of light emitted by one or more of the light sources 400 can be adjusted (e.g., increased). In some examples, the number of light sources 400 of the backlight assembly 306 is increased to increase an amount brightness provided by the backlight. In some examples, the orientation of the light sources 400 can be adjusted to account for the presence of the openings 318, as disclosed in connection with FIG. 5.

Figure 5:
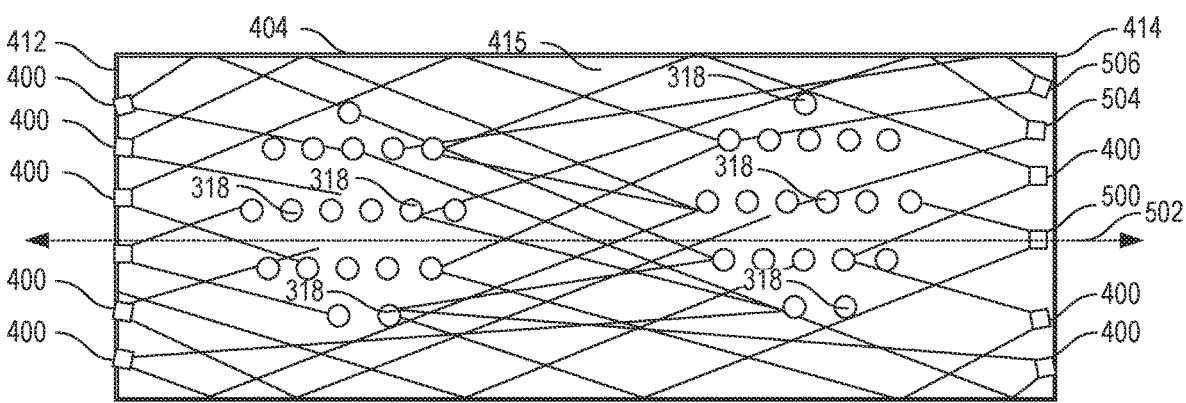
FIG. 5 is a top view of a portion of the example backlight assembly of FIG. 4.

FIG. 5 is a top view of the light sources 400 and the lightguide plate 404 of the backlight assembly 306 of FIG. 4. In the example of FIG. 5, the light sources 400 include LEDs disposed along the sides 412, 414 of the lightguide plate 404 (e.g., supported by the printed circuit boards 411 of FIG. 4). In the example of FIG. 5, some of the light sources 400 are disposed at an angle relative to the first surface 415 of the lightguide plate 404. The light source(s) 400 can be coupled to (e.g., mounted to) the printed circuit board(s) 411 (FIG. 4) at various angles relative to the surface of the lightguide plate 404 to adjust the respective paths of light emitted by the light source(s) 400 relative to the locations of the openings 318 formed in the lightguide plate 404. In this particular example, one or more the light sources 400 are positioned such that the light emitted by the light source bypasses or is not directed into or substantially directed into one or more of the openings 318. For example, in FIG. 5, a first light source 500 is disposed at an angle of 0° relative to a longitudinal axis 502 extending through the first surface 415 of the lightguide plate 404. A second light source 504 is disposed at an angle of 45° relative to the longitudinal axis 502. As a result, the second light source 504 emits light an angle away from the openings 318 that would otherwise be within the path(s) of light. Put another way, the light emitted by the second light source 504 is at an angle relative to the vertical axis 311 (FIG. 3) extending through the first and second covers 110, 300 of the second housing 108. A third light source 504 is disposed at an angle of 60° relative to the longitudinal axis 502 to direct light emitted by the third light source 506 away from the openings 318 that would otherwise be within the path(s) of light. The angles of the light sources 502, 504, 506 and/or one or more other light sources 400 relative to the longitudinal axis 502 can differ from the examples shown in FIG. 5 based on, for example, the locations of the opening(s) 318 relative to the light source(s) 400, 502, 504, 506.

In some examples, an amount of spacing between each of the light sources 400 is selected to reduce (e.g., minimize) the creation of shadow zones or regions, or areas of reduced brightness. The number, size, orientation, placement, etc. of the light sources 400 can be based on a size of the keyboard 104; a number of keycaps 106; a layout of the keyboard 104; sizes of the keycaps 106; size(s) of the airgap(s) 202; size(s) of the opening(s) 318 and, thus, the airflow passages defined by the openings 318, etc.

In some examples, the locations of the openings 318 formed in the layers of the backlight assembly 306 (as well as the corresponding locations of the openings 318 formed in the plate 304 and the keyboard membrane(s) 302) are selected to prevent or substantially prevent the creation of shadow regions, or areas of non-uniform brightness across the keyboard 104. For example, as illustrated in FIG. 5, the openings 318 can be formed such that the openings 318 are proximate to center region(s) of the lightguide plate 404 and distal to the edges of the lightguide plate 404. More light may pass through the center regions of the lightguide plate 404 than near the edges of the plate 404. Thus, forming the openings 318 proximate to the center region(s) of the lightguide plate 404 can result in less disruption to the brightness of the backlight 306. Put another away, as illustrated in FIG. 1, the locations of the openings 318 can be proximate to the keycaps 106 positioned proximate a center region of the keyboard 104 (e.g., the keycaps 106 representing letters in QWERTY keyboard) rather than the keycaps 106 located proximate to an edge of the keyboard 104 (e.g., the keycaps 106 representing function keys or F-keys of the keyboard 104). Thus, in some examples, the air passages defined by the openings 318 are not present for each keycap 106, but instead are present for a subset (e.g., less than all) of the keycaps 106.

Figure 6:
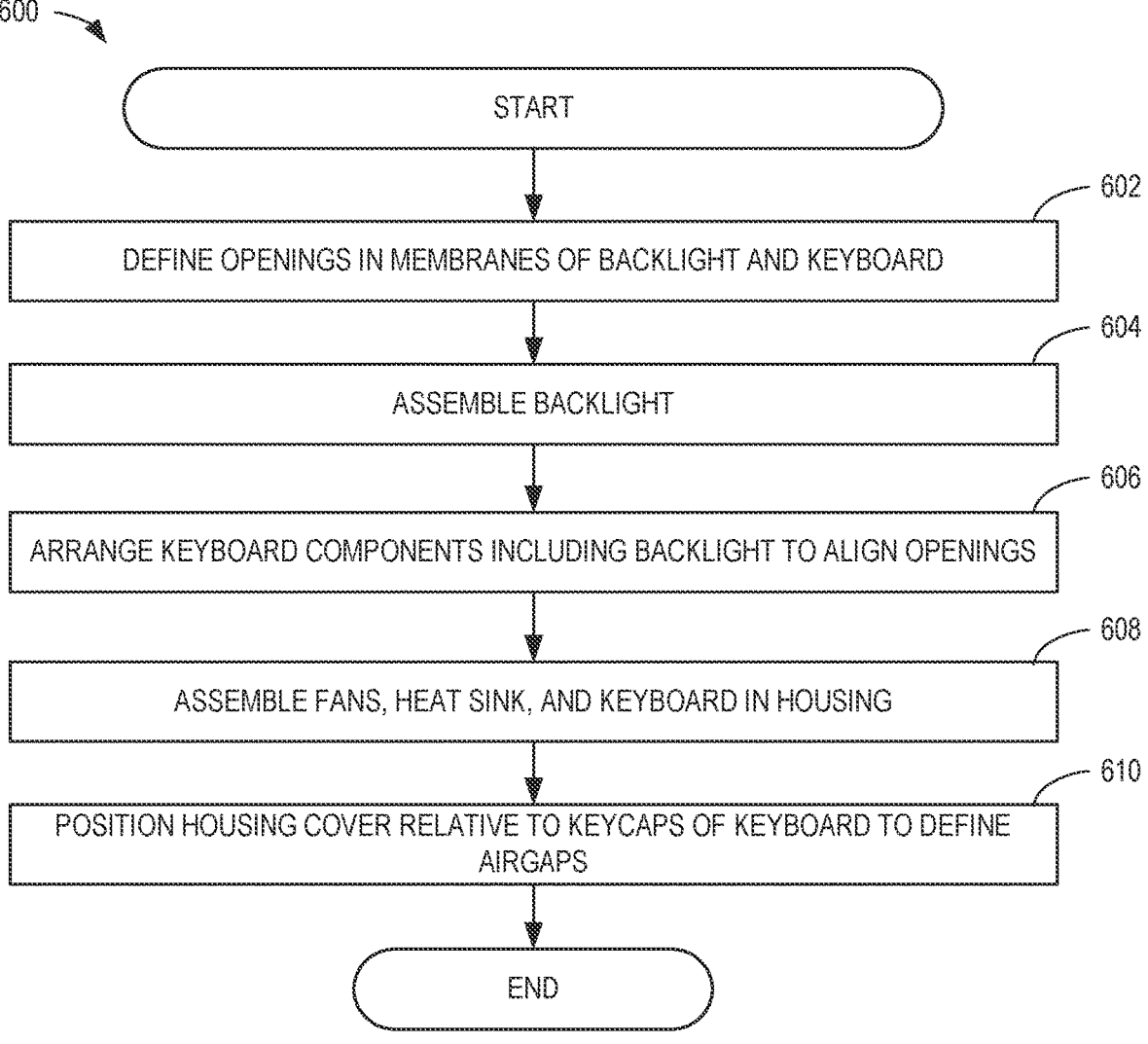
FIGS. 6 and 7 are flowcharts of example methods to manufacture the example cooling system of FIG. 3.

FIG. 6 is a flowchart illustrating an example method 600 for manufacturing a cooling system of an electronic device such as the example cooling system 320 of FIGS. 3-5. The example method 600 of FIG. 6 begins at block 602 in which the openings or apertures 318 are defined in the membranes of the backlight assembly 306 and the keyboard 104. For example, the openings 318 can be defined to extend through surfaces the reflector 402, the lightguide plate 404, the diffuser film 406, the prism film 408, and the coversheet 410 of the blacklight assembly 306, respectively. The openings 318 are defined to extend through the membranes 302 and the plate 304 of the keyboard 104. For example, the openings 318 can be drilled, pierced, or otherwise cut into in the respective backlight and keyboard membranes 302, 304, 402, 404, 406, 408, 410.

Figure 7:
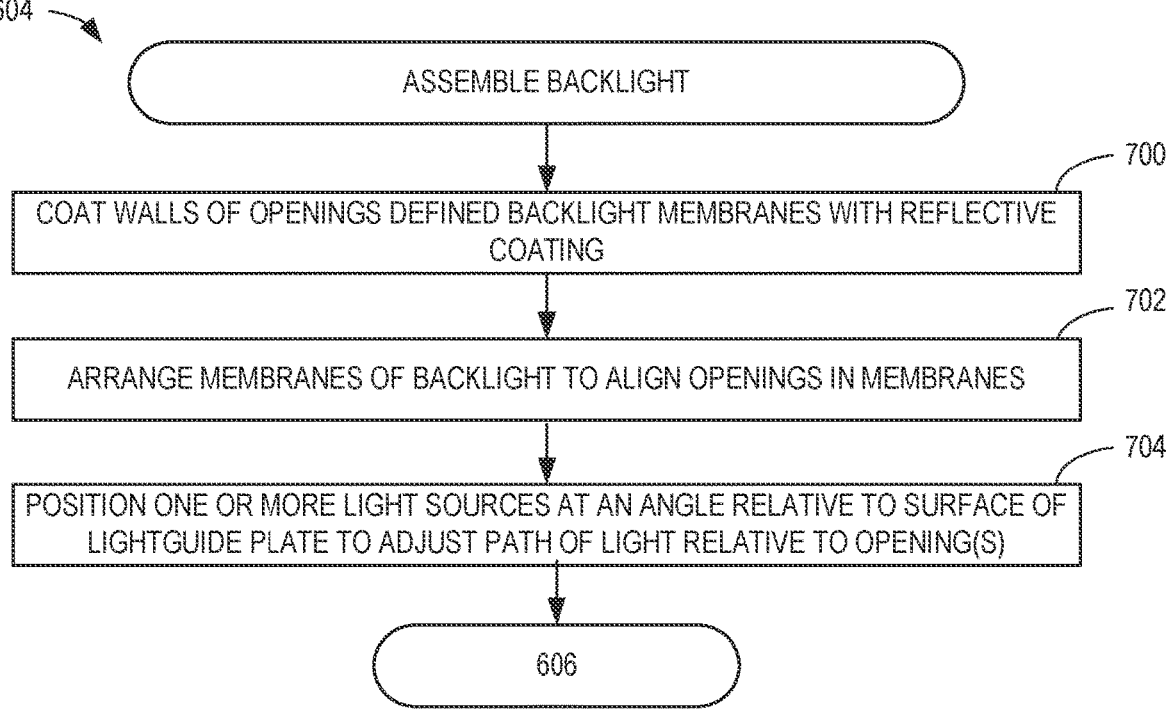

At block 604, the blacklight assembly 306 is constructed as disclosed, for example, in connection with the flowchart of FIG. 7. At block 606, the components of the keyboard are arranged to align the openings 318 defined in the respective membranes or layers 302, 304, 402, 404, 406, 408, 410. For example, the membranes 302 can be supported by the plate 304. Also, the keycaps 106 can be operatively coupled to a first one of the membranes 302 such that respective keycaps 106 engage the membrane 302 when the keycap 106 is depressed. The plate 304 can be disposed above the backlight assembly 306. Corresponding openings 318 in the respective keyboard membranes 302, the plate 304, and the membranes 402, 404, 406, 408, 410 of the backlight assembly 306 are aligned to define a flow path for air.

At block 608, the fans 312, 314; the heat sink 316; and the keyboard 104 (including the backlight assembly 306) are assembled in a housing of the electronic device 100. For example, the fans 312, 314 and the keyboard 104 are supported by the second housing 108 of FIGS. 1 and 3 such that the openings 318 formed in the layers of the keyboard 104 are disposed proximate to the fans 312, 314. For example, as shown in FIG. 3, the fans 312, 314 are located proximate to a second cover 300 (e.g., a D-cover) of the housing 108 and the keyboard 104 (including the layers 302, 304, 402, 404, 406, 408, 410 with the openings 318) is disposed on a side of the fans 312, 314 opposite the side of the fans 312, 314 directed toward the second cover 300.

At block 610, a first cover 110 (e.g., a C-cover) of the housing 108 is positioned relative to the keycaps 106 of the keyboard 104 to define the airgaps or spacings 202. For example, a surface of the first cover 110 can includes openings through which the keycaps 106 at least partially protrude relative to the cover 110. The first cover 110 and the keycaps 106 are spaced apart such that the airgaps 202 are defined between the first cover 110 and the respective keycaps 106. The openings 318 formed in the layers of the keyboard 104 provide a flow path for air drawn into the housing 108 via the airgaps 202 during operation of the fans 312, 314.

FIG. 7 is a flowchart of an example method 604 to implement block 604 of the example method 600 of FIG. 6 to assemble the blacklight 306. At block 700, the method 604 includes coating the walls 412 defining the openings 318 in the respective backlight layers 402, 404, 406, 408, 410 with a reflective coating to reduce disruptions to the uniformity of the brightness of the backlight 306 due to the openings 318.

At block 702, the membranes of the backlight assembly 306 (e.g., the reflector 402, the lightguide plate 404, the diffuser film 406, the prism film 408, and the coversheet 410 of FIG. 4) are arranged to align the opening(s) 318 formed in each backlight membrane relative to one another.

At block 704, the method 604 includes positioning one or more of the light sources 400 at an angle relative to the surface of the lightguide plate 404 to adjust a path of light emitted by the light source 400 relative to the opening(s) 318 in the lightguide plate 404. For example, one or more of the light sources 400 may be angled or rotated on the printed circuit board 411 supporting the light source(s) 400 to at least partially direct a path of light emitted by the light source away from the opening(s) 318. As a result of the positioning of the light source(s) 400, the light emitted by those light source(s) bypasses or substantially bypassing the opening(s) 318 to reduce disruptions to the uniformity of the brightness of the backlight 306 due to the openings 318.

Although the example methods 600, 700 are described with reference to the flowcharts illustrated in FIGS. 6 and 7, many other methods of manufacturing the example cooling assembly of FIGS. 3-5 may alternatively be used. For example, the order of execution of the blocks may be changed, and/or some of the blocks described may be changed, eliminated, or combined. Similarly, additional operations may be included in the manufacturing process before, in between, or after the blocks shown in FIGS. 6 and/or 7.

From the foregoing, it will be appreciated that example systems, methods, apparatus, and articles of manufacture have been disclosed that provide for cooling of an electronic device via airflow through inlets defined by a keyboard of the device while maintaining a backlight of the keyboard. Examples disclosed herein provide for efficient cooling via airgaps in areas of the keyboard, which provide for low resistance airflow paths. Example disclosed herein include openings defined in a backlight of the keyboard to provide for airflow between the keyboard airgaps and the fans while permitting substantially unfirm lighting of the keyboard by the backlight of the keyboard. The portions of the backlight defining the openings can include reflective coatings to facilitate transmission of light and reduce human visually perceptible disruptions to the uniformity of the backlight with respect to the keycaps of the keyboard. Some example backlights disclosed herein include light sources disposed at an angle to cause light emitted by the light sources to bypass the openings or otherwise direct the light away from the openings. Thus, examples disclosed herein provide for cooling of an electronic device via keyboard inlets while enabling a backlight to be used with the keyboard. Further, as result of the keyboard inlets and associated airflow paths, a housing of the device (e.g., a D-cover or bottom surface of a laptop) can form an uninterrupted surface without exterior air vents.

Example apparatus, systems, methods, and articles of manufacture for cooling apparatus for electronic devices are disclosed herein. Further examples and combinations thereof include the following.

Example 1 includes an electronic device comprising a housing including a cover; a keyboard carried by the housing, the keyboard including keycaps, at least a portion of the keycaps protruding relative to the cover, a first gap between a first one of the keycaps and the cover; a backlight carried by the housing, the backlight including a first opening; and a fan carried by the housing, the first opening defining an airflow path in the housing between the fan and the first gap.

Example 2 includes the electronic device of example 1, wherein the keyboard includes a membrane operatively coupled to the keycaps, the membrane including a second opening defined therein, the first opening and the second opening defining the airflow path.

Example 3 includes the electronic device of examples 1 or 2, wherein the keyboard includes a metal plate, the metal plate to support the membrane, the metal plate including a third opening defined therein, the first opening, the second opening, and the third opening defining the airflow path.

Example 4 includes the electronic device of any of examples 1-3, wherein the first one of the keycaps extends over the second opening.

Example 5 includes the electronic device of any of examples 1-4, wherein a wall of the backlight defining the first opening includes a reflective coating.

Example 6 includes the electronic device of any of examples 1-5, wherein the fan is a first fan, the airflow path is a first airflow path, and further including a second fan, the second fan spaced apart from the first fan in the housing, the backlight including a second opening spaced apart from the first opening, the second opening defining a second airflow path in the housing between (a) the second fan and (b) a second gap between a second one of the keycaps and the cover.

Example 7 includes the electronic device of any of examples 1-6, wherein the cover is first cover and the housing includes a second cover opposite the first cover, the second cover defined by an uninterrupted surface.

Example 8 includes the electronic device of any of examples 1-7, wherein the backlight includes a light source, the light source to emit light at an angle relative to a vertical axis extending through the backlight to direct light emitted by the light source away from the first opening.

Example 9 includes the electronic device of any of examples 1-8, wherein the first gap is between an edge of the first one of the keycaps and the cover.

Example 10 includes the electronic device of any of examples 1-9, wherein the first gap is between a corner of the first one of the keycaps and the cover.

Example 11 includes the electronic device of any of examples 1-10, wherein the first gap is annular.

Example 12 includes the electronic device of any of examples 1-11, wherein the first gap is a ring.

Example 13 includes a compute device comprising a housing; a keyboard including a keycap, a surface of the housing spaced apart from the keycap and defining a gap adjacent the keycap; a backlight carried by the housing, the backlight including a first membrane including a first aperture, the first aperture in fluid communication with the gap, a light source to emit light away from the first aperture; and a fan carried by the housing.

Example 14 includes the compute device of example 13, wherein at least a portion of the keycap protrudes relative to the surface of the housing.

Example 15 includes the compute device of examples 13 or 14, wherein the first aperture is defined by a wall of the first membrane, the wall including a reflective coating.

Example 16 includes the compute device of any of examples 13-15, wherein the keyboard includes a second membrane, the second membrane including a second aperture, the first aperture and the second aperture in fluid communication with the gap.

Example 17 includes the compute device of any of examples 13-16, wherein an axis extending through a first cover of the housing and a second cover of the housing passes through the first aperture and the second aperture.

Example 18 includes the compute device of any of examples 13-17, wherein the first aperture and the second aperture define at least a portion of an airflow path, the airflow path extending between the fan and the gap.

Example 19 includes the compute device of any of examples 13-18, wherein the light source is a first light source and the backlight further includes a second light source, the first light source at a first angle relative to a longitudinal axis extending through the first membrane, the second light source disposed at a second angle relative to the longitudinal axis, the first angle different than the second angle.

Example 20 includes an electronic device comprising a housing; a web; a keyboard including keycaps in openings of the web, spacings defined between respective ones of the keycaps and the web; a first membrane covered by the keycaps, a first set of openings defined in the first membrane; and a backlight including a second set of openings, respective ones of the openings of the first set of openings aligned with corresponding ones of the openings of the second set of openings to define airflow paths; and a fan to draw air through the airflow paths, the airflow paths extending between the fan and the spacings.

Example 21 includes the electronic device of example 20, wherein the fan is a first fan, the airflow paths are first airflow paths, and further including a second fan, a third set of openings defined in the first membrane, the backlight including a fourth set of openings, respective ones of the openings of the third set of openings aligned with corresponding ones of the openings of the fourth set of openings to define second airflow paths in the housing, the second airflow paths extending between the second fan and the spacings.

Example 22 includes the electronic device of examples 20 or 21, wherein a first one of the keycaps extends over one or more of the openings of the first set of openings.

Example 23 includes the electronic device of any of examples 20-22, wherein a wall defining a first one of the openings of the second set of openings includes a reflective material.

Example 24 includes the electronic device of any of examples 20-23, wherein the backlight includes a second membrane and a third membrane, the openings of the second set of openings extending through the second membrane and the third membrane.

Example 25 includes the electronic device of any of examples 20-24, wherein the second set of openings is defined in the second membrane distal to an edge of the second membrane.

Example 26 includes a method of manufacturing an electronic device, the method comprising defining a first aperture in a backlight; defining a second aperture in a membrane of a keyboard; disposing the backlight and the membrane of the keyboard in a housing, the first aperture aligned with the second aperture; and disposing a cover relative to the keyboard, a gap defined between a keycap of the keyboard and the cover, the first aperture and the second aperture defining an airflow path between the gap and a fan in the housing.

Example 27 includes the method of example 26, further including coating a wall of the backlight adjacent the first aperture with a reflective coating.

Example 28 includes the method of examples 26 or 27, further including positioning a light source of the backlight to direct light away from the first aperture.

Example 29 includes the method of any of examples 26-28, further including defining a third aperture in a metal plate of the keyboard; and disposing the metal plate in the housing, the third aperture aligned with the first aperture and the second aperture.

Example 30 includes the method of any of examples 26-29, wherein defining the first aperture in the membrane of the backlight includes drilling the first aperture in the membrane.

Example 31 includes the method of any of examples 26-30, further including defining a third aperture in the backlight, the first aperture associated with a first cluster of apertures and the third aperture associated with a second cluster of apertures.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An electronic device comprising:
a housing including a cover;
a keyboard carried by the housing, the keyboard including keycaps, at least a portion of the keycaps protruding relative to the cover, a gap between a first one of the keycaps and the cover;
a backlight carried by the housing, the backlight including an opening and at least two membranes, the opening extending through the at least two membranes; and
a fan carried by the housing, the opening defining an airflow path in the housing between the fan and the gap.

2. The electronic device of claim 1, wherein the opening is a first opening, the keyboard includes a membrane operatively coupled to the keycaps, and the membrane includes a second opening defined therein, the first opening and the second opening defining the airflow path.

3. The electronic device of claim 2, wherein the keyboard includes a metal plate, the metal plate supports the membrane, and the metal plate includes a third opening defined therein, the first opening, the second opening, and the third opening defining the airflow path.

4. The electronic device of claim 2, wherein a first one of the keycaps extends above the second opening.

5. The electronic device of claim 1, wherein a wall of the backlight defining the opening includes a reflective coating.

6. The electronic device of claim 1, wherein the opening is a first opening, the fan is a first fan, the airflow path is a first airflow path, and including a second fan, the second fan spaced apart from the first fan in the housing,
the backlight including a second opening spaced apart from the first opening, the second opening defining a second airflow path in the housing between (a) the second fan and (b) a second gap between a second one of the keycaps and the cover.

7. The electronic device of claim 1, wherein the cover is first cover and the housing includes a second cover opposite the first cover, the second cover defined by an uninterrupted surface.

8. The electronic device of claim 1, wherein the backlight includes a light source, the light source to emit light at an angle relative to a vertical axis extending through the backlight to direct light emitted by the light source away from the opening.

9. The electronic device of claim 1, wherein the at least two membranes of the backlight includes a first membrane, the keycaps include first keycaps proximate to an edge of the keyboard and second keycaps distal to the edge, and the opening is defined in a portion of the first membrane proximate to the second keycaps.

10. A compute device comprising:
a housing;
a keyboard including a keycap, a surface of the housing spaced apart from the keycap and defining a gap adjacent the keycap;
a backlight carried by the housing, the backlight including:
a first membrane and a second membrane,
an aperture extending through the first membrane and the second membrane, the aperture in fluid communication with the gap,
a light source to emit light away from the aperture; and
a fan carried by the housing.

11. The compute device of claim 10, wherein at least a portion of the keycap protrudes relative to the surface of the housing.

12. The compute device of claim 10, wherein the aperture is a first aperture, the keyboard includes a third membrane, the third membrane of the keyboard including a second aperture, the first aperture and the second aperture in fluid communication with the gap.

13. The compute device of claim 12, wherein an axis extending through a first cover of the housing and a second cover of the housing passes through the first aperture and the second aperture.

14. The compute device of claim 12, wherein the first aperture and the second aperture define at least a portion of an airflow path, the airflow path extending between the fan and the gap.

15. The compute device of claim 10, wherein the light source is a first light source and the backlight includes a second light source, the first light source at a first angle relative to a longitudinal axis extending through the first membrane, the second light source at a second angle relative to the longitudinal axis, the first angle different than the second angle.

16. An electronic device comprising:

a housing;

a web;

a keyboard including:

keycaps in openings of the web, spacings defined between respective ones of the keycaps and the web;

a first membrane covered by the keycaps, a first set of openings defined in the first membrane; and a backlight including a second membrane, a third membrane, and a second set of openings, the openings of the second set of openings extending through the second membrane and the third membrane, respective ones of the openings of the first set of openings aligned with corresponding ones of the openings of the second set of openings to define airflow paths; and a fan to draw air through the airflow paths, the airflow paths extending between the fan and the spacings.

17. The electronic device of claim 16, wherein the fan is a first fan, the airflow paths are first airflow paths, and including a second fan, a third set of openings defined in the first membrane, the backlight including a fourth set of openings, respective ones of the openings of the third set of openings aligned with corresponding ones of the openings of the fourth set of openings to define second airflow paths in the housing, the second airflow paths extending between the second fan and the spacings.

18. The electronic device of claim 16, wherein a first one of the keycaps extends over one or more of the openings of the first set of openings.

19. The electronic device of claim 16, including a wall defining a first one of the openings of the second set of openings, the wall including a reflective material.

20. The electronic device of claim 16, wherein the second set of openings is defined in the second membrane distal to an edge of the second membrane.

\* \* \* \* \*